US012689774B2

(12) United States Patent
Jiang et al.

(10) Patent No.: US 12,689,774 B2
(45) Date of Patent: Jul. 21, 2026

(54) MEDIA INFORMATION PROCESSING METHOD AND DEVICE, MEDIA INFORMATION PLAYBACK METHOD AND DEVICE, AND STORAGE MEDIUM

(71) Applicant: ZTE Corporation, Shenzhen (CN)

(72) Inventors: Ping Jiang, Shenzhen (CN); Qiuting Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/853,883

(22) PCT Filed: May 15, 2023

(86) PCT No.: PCT/CN2023/094337
§ 371 (c)(1),
(2) Date: Oct. 3, 2024

(87) PCT Pub. No.: WO2023/236732
PCT Pub. Date: Dec. 14, 2023

(65) Prior Publication Data
US 2025/0240464 A1 Jul. 24, 2025

(30) Foreign Application Priority Data
Jun. 10, 2022 (CN) .......................... 202210651448.4

(51) Int. Cl.
*H04N 21/84* (2011.01)
*H04L 65/60* (2022.01)
(Continued)

(52) U.S. Cl.
CPC ....... *H04N 21/21805* (2013.01); *H04L 65/60* (2013.01); *H04N 21/23412* (2013.01); *H04N 21/84* (2013.01)

(58) Field of Classification Search
CPC ....... H04N 21/21805; H04N 21/23412; H04N 21/84; H04L 65/60
See application file for complete search history.

(56) References Cited

U.S. PATENT DOCUMENTS

| | | | |
|---|---|---|---|
| 2019/0174150 A1 | 6/2019 | D'Acunto et al. | |
| 2020/0228775 A1 | 7/2020 | Sakai | |

(Continued)

FOREIGN PATENT DOCUMENTS

| | | |
|---|---|---|
| CA | 3007591 A1 | 6/2017 |
| CN | 109565610 A | 4/2019 |

(Continued)

OTHER PUBLICATIONS

International Search Report and Written Opinion for International Application No. PCT/CN2023/094337, mailed Sep. 8, 2023.

*Primary Examiner* — Thai Q Tran
*Assistant Examiner* — Jose M Mesa
(74) *Attorney, Agent, or Firm* — Wolf, Greenfield & Sacks, P.C.

(57) ABSTRACT

A media information processing method and apparatus, a media information playback method and apparatus are disclosed. The media information processing method may include: acquiring media of a plurality of viewpoints, the plurality of viewpoints include at least one real viewpoint and at least one virtual viewpoint, and the media of the at least one virtual viewpoint is generated according to the media of the at least one real viewpoint; generating a media stream according to the media of the plurality of viewpoints, the media stream is a media file including media information; and performing segmentation and packing of the media stream, and generating a Media Presentation Description (MPD) text of the media, the MPD text includes a description of the real viewpoints and a description of the at least (Continued)

Acquire media of a plurality of viewpoints, where the plurality of viewpoints include at least two real viewpoints and at least one virtual viewpoint, and the media of the at least one virtual viewpoint is generated according to the media of the at least two real viewpoints — S1000

Generate a media stream according to the media of the plurality of viewpoints, where the media stream is a media file including media information — S2000

Perform segmentation and packing of the media stream to generate an MPD text of the media, where the MPD text includes a description of the real viewpoints and description of the at least one virtual viewpoint, and the MPD text is used for acquiring media stream information of a viewpoint to be played — S3000 one virtual viewpoint, and the MPD text is used for acquiring media stream information of a viewpoint to be played.

20 Claims, 10 Drawing Sheets

(51) Int. Cl.
*H04N 21/218* (2011.01)
*H04N 21/234* (2011.01)

(56) References Cited

U.S. PATENT DOCUMENTS

| | | | | |
|---|---|---|---|---|
| 2020/0322586 | A1* | 10/2020 | Lee | H04N 21/8583 |
| 2021/0021806 | A1* | 1/2021 | He | H04N 13/158 |
| 2021/0058600 | A1 | 2/2021 | Deshpande | |
| 2021/0152808 | A1 | 5/2021 | He et al. | |
| 2022/0217314 | A1* | 7/2022 | Oh | H04N 21/234 |

FOREIGN PATENT DOCUMENTS

| | | | |
|---|---|---|---|
| CN | 111133764 A | 5/2020 |
| CN | 111955011 A | 11/2020 |
| CN | 112237005 A | 1/2021 |

* cited by examiner

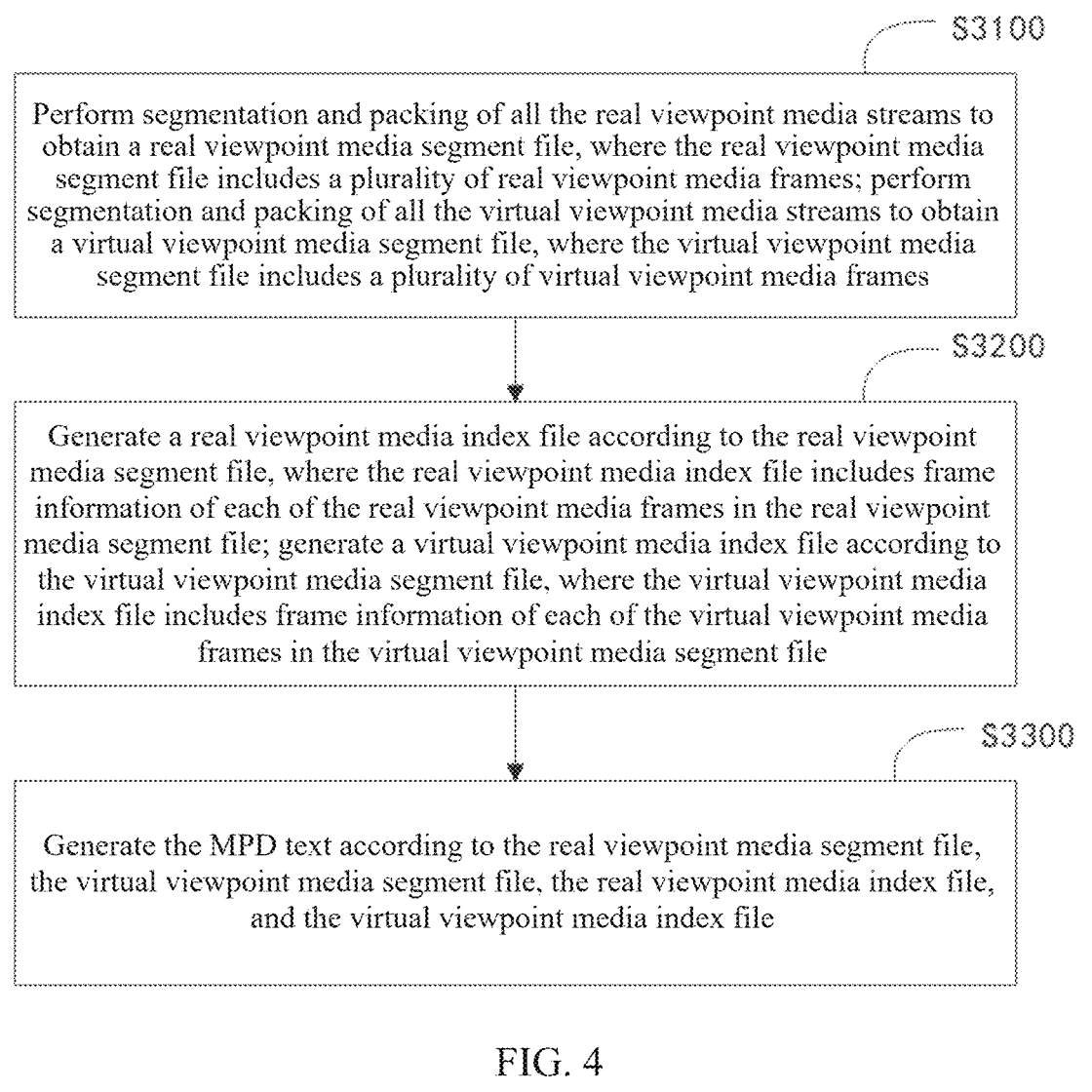

S3100

Perform segmentation and packing of all the real viewpoint media streams to obtain a real viewpoint media segment file, where the real viewpoint media segment file includes a plurality of real viewpoint media frames; perform segmentation and packing of all the virtual viewpoint media streams to obtain a virtual viewpoint media segment file, where the virtual viewpoint media segment file includes a plurality of virtual viewpoint media frames

S3200

Generate a real viewpoint media index file according to the real viewpoint media segment file, where the real viewpoint media index file includes frame information of each of the real viewpoint media frames in the real viewpoint media segment file; generate a virtual viewpoint media index file according to the virtual viewpoint media segment file, where the virtual viewpoint media index file includes frame information of each of the virtual viewpoint media frames in the virtual viewpoint media segment file

S3300

Generate the MPD text according to the real viewpoint media segment file, the virtual viewpoint media segment file, the real viewpoint media index file, and the virtual viewpoint media index file

FIG. 4

Figure 5:
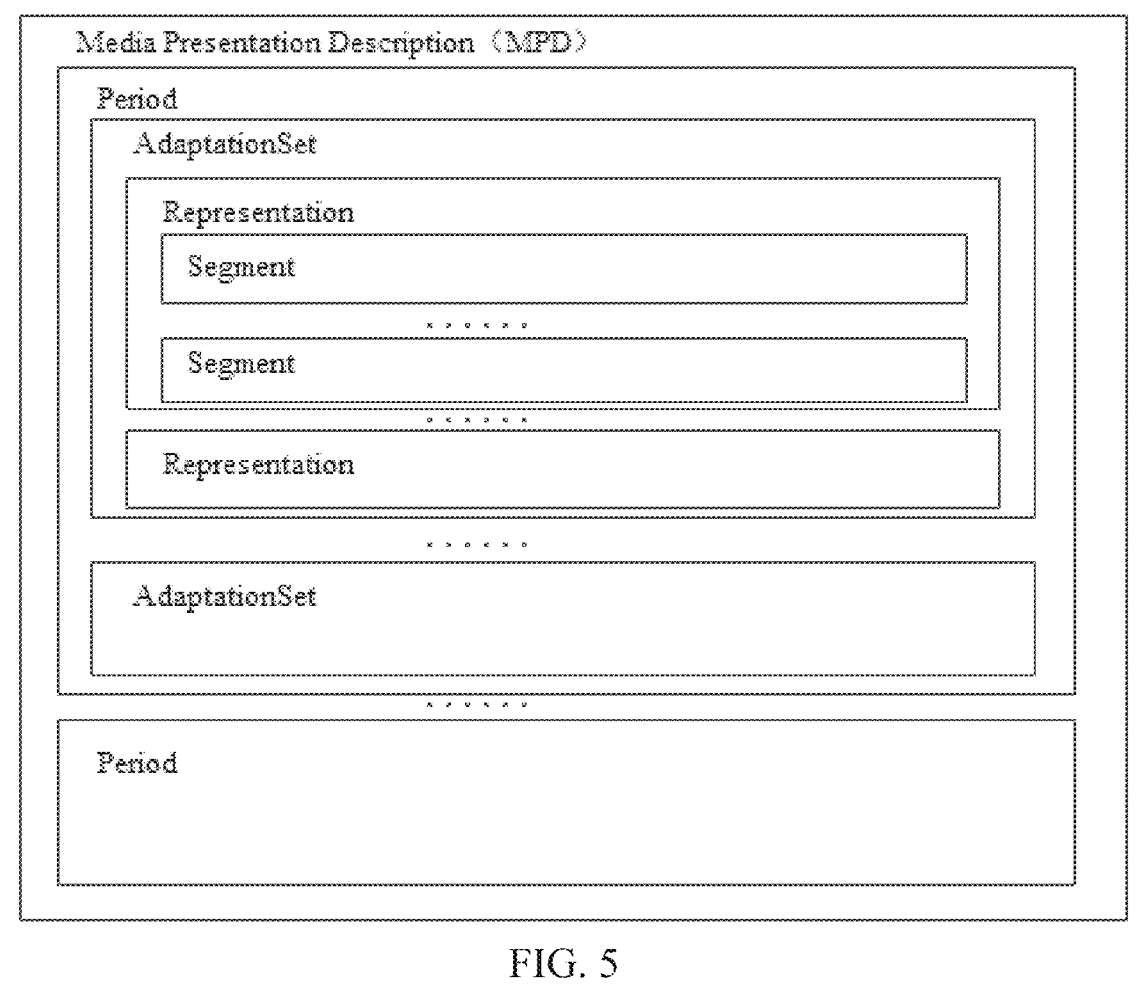

Media Presentation Description （MPD）

Period

AdaptationSet

Representation

Segment

· · · · · ·

Segment

· · · · · ·

Representation

· · · · · ·

AdaptationSet

· · · · · ·

Period

Acquire an MPD text, where the MPD text describes index file information and media segment file information

S5000

Acquire an index file according to the index file information in the MPD text

S6000

Acquire a to-be-played media frame according to the index file

S7000

Render and play the to-be-played media frame according to the media segment file information Real shooting position 1

Virtual shooting position 1

Real shooting position 2

Virtual shooting position 2

Real shooting position 1

Real shooting position 2

Real shooting position 3

Real shooting position 4

MEDIA INFORMATION PROCESSING METHOD AND DEVICE, MEDIA INFORMATION PLAYBACK METHOD AND DEVICE, AND STORAGE MEDIUM

CROSS-REFERENCE TO RELATED APPLICATION

This application is a national stage filing under 35 U.S.C. § 371 of international application number PCT/CN2023/094337, filed May 15, 2023, which claims priority to Chinese patent application No. 202210651448.4 filed Jun. 10, 2022. The contents of these applications are incorporated herein by reference in their entirety.

TECHNICAL FIELD

Embodiments of the present disclosure relate to the field of computer technologies, and in particular, to a media information processing method and apparatus, a media information playback method and apparatus, and a storage medium.

BACKGROUND

With the advancement of computer technologies, users increasingly seek a more immersive experience in video playing, virtual games and other scenarios through free viewpoint switching. However, during the process of free-viewpoint shooting, the parallax between adjacent views can be significant due to constraints such as limited equipment space or venue space. Virtual viewpoints are introduced to reduce the parallax between adjacent views, thereby addressing the problem of video jitter during view switching.

In the existing technology, the processing and playing of free-viewpoint videos are mainly realized through two schemes: stitching and real-time synthesis. The stitching scheme occupies high transmission bandwidth and loses the original image quality of video frames, while the real-time view synthesis scheme can hardly ensure the playback effect and requires high equipment performance. Therefore, finding a solution that preserves playback quality while conserving bandwidth resources is an urgent challenge that needs to be addressed.

SUMMARY

Embodiments of the present disclosure provide a media information processing method and apparatus, a media information playback method and apparatus, and a storage medium, to ensure the playback quality while saving bandwidth resources.

In accordance with a first aspect of the present disclosure, an embodiment provides a media information processing method, including: acquiring media of a plurality of viewpoints, where the plurality of viewpoints include at least two real viewpoints and at least one virtual viewpoint, and the media of the at least one virtual viewpoint is generated according to the media of the at least two real viewpoints; generating a media stream according to the media of the plurality of viewpoints, where the media stream is a media file including media information; and performing segmentation and packing of the media stream and generating a Media Presentation Description (MPD) text of the media, where the MPD text includes a description of the real viewpoints and a description of the at least one virtual viewpoint, and the MPD text is used for acquiring media stream information of a viewpoint to be played.

In accordance with a second aspect of the present disclosure, an embodiment provides a media information playback method, including: acquiring an MPD text, where the MPD text describes index file information and media segment file information; acquiring an index file according to the index file information in the MPD text; acquiring a to-be-played media frame according to the index file; and rendering and playing the to-be-played media frame according to the media segment file information.

In accordance with a third aspect of the present disclosure, an embodiment provides a media information processing apparatus, including: a memory, a processor, and a computer program stored in the memory and executable by the processor which, when executed by the processor, causes the processor to perform the media information processing method in accordance with the first aspect.

In accordance with a seventh aspect of the present disclosure, an embodiment provides a media information playback apparatus, including: a memory, a processor, and a computer program stored in the memory and executable by the processor which, when executed by the processor, causes the processor to perform the media information playback method in accordance with the second aspect.

In accordance with a fifth aspect of the present disclosure, an embodiment provides a computer-readable storage medium, storing a computer-executable instruction which, when executed by a processor, causes the processor to perform the media information processing method in accordance with the first aspect, or the media information playback method in accordance with the second aspect.

According to the media information processing method and apparatus, the media information playback method and apparatus, and the storage medium provided in the embodiments of the present disclosure, virtual viewpoints are additionally provided, and a description of real viewpoints and a description of virtual viewpoints are recorded in an MPD text. In this way, when a terminal device downloads frame data according to frame information in the MPD text, bandwidth resources can be saved and the delay in view interaction can be reduced, thereby ensuring the image quality of playback.

BRIEF DESCRIPTION OF DRAWINGS

FIG. 4 is a flowchart of a process of generating an MPD text according to an embodiment of the present disclosure;

FIG. 5 is a schematic structural diagram of an MPD file according to an embodiment of the present disclosure;

DETAILED DESCRIPTION

Figures 1, 2:
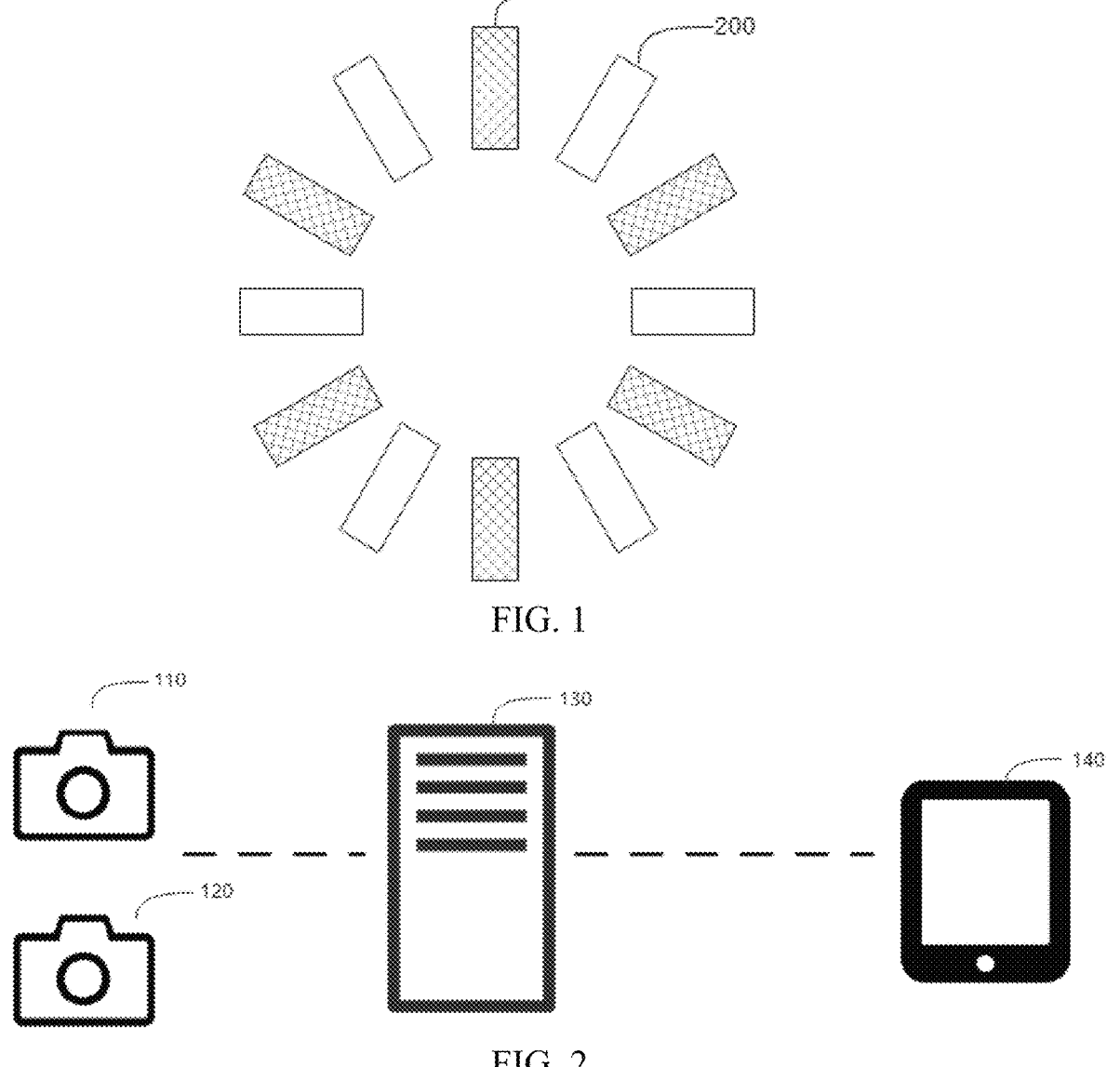
FIG. 1 is a schematic diagram of a scenario of shooting and playing a free-viewpoint video according to an embodiment of this application.
FIG. 2 is a schematic diagram of a system architecture of an application scenario of a media information processing method according to an embodiment of the present disclosure.

To make the purposes, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. Terms such as "first," "second," and similar designations in the description, the claims, and the accompanying drawings are used to distinguish similar purposes, and are not necessarily used to describe a specific sequence or a precedence order.

In the description of the embodiments of the present disclosure, unless otherwise explicitly defined, the terms such as "configure", "install/mount" and "connect" should be understood in a broad sense, and those having ordinary skills in the art can reasonably determine the specific meanings of the above terms in the embodiments of the present disclosure based on the specific contents of the technical schemes. In the embodiments of the present disclosure, any embodiment or design described following the terms such as "in an embodiment", "in some embodiments" and "for example" is used to indicate examples, explanations, or illustrations, and should not be construed as being superior or advantageous over other embodiments or designs. The use of the terms such as "in an embodiment", "in some embodiments" and "for example" is intended to present the relevant concepts in a concrete manner.

The embodiments of the present disclosure may be applied to various devices related to image and video playback, such as a mobile phone, a tablet computer, a desktop computer, a notebook computer, a wearable device, a vehicle-mounted device, a liquid crystal display, a cathode ray tube display, a holographic imaging display, a projector, and other terminal devices, and may also be applied to various devices for processing image and video data, such as a mobile phone, a tablet computer, a desktop computer, a notebook computer, a wearable device, a vehicle-mounted device, and other server devices, which is not limited in the embodiments of the present disclosure.

Immersive media enables users to experience a highly realistic virtual space environment visually and audibly through video, audio and other technologies, and realizes free view switching to provide a more realistic immersive experience. Free-viewpoint video is a novel Virtual Reality (VR) video technology, which generally uses multiple cameras to shoot around a target scene, and uses a virtual view synthesis technology to acquire a virtual view image. The free-viewpoint video technology enables the users to view the target scene from any view and obtain a better viewing experience than a panoramic video.

FIG. 1 is a schematic diagram of a scenario of shooting and playing a free-viewpoint video in the existing technology. As shown in FIG. 1, a free-viewpoint video is usually a collection of videos acquired by shooting the same three-dimensional scene from different views using a multi-camera matrix array. The user can freely perform view switching during viewing the free-viewpoint video, to view a corresponding video image at a real viewpoint or a synthesized virtual viewpoint. Because there are a plurality of real viewpoints and virtual viewpoints, this embodiment is described using an example where the real viewpoints are obtained through shooting by cameras at real shooting positions 100, and the virtual viewpoints are synthetic images corresponding to virtual shooting positions 200.

In existing free-viewpoint technologies, two methods are mainly used to synthesize a free-viewpoint video image: a stitching method and a real-time synthesis method. In the stitching method, synchronized texture maps of multiple views and depth maps corresponding to the views are stitched, and stitched images of multiple frame moments are compressed in a unified format and transmitted to a terminal device for decoding. However, the stitching method occupies high transmission bandwidth, and the use of existing coding methods leads to great compression loss of the stitched images, affecting the image quality of free-viewpoint video images reconstructed by the terminal device. The real-time synthesis method requires high performance of the equipment for real-time synthesis of video images, consumes a lot of equipment performance when running, and cannot ensure the effect of view synthesis.

In view of the above, the embodiments of the present disclosure provide a media information processing method and apparatus, a media information playback method and apparatus, and a storage medium. A description of the real viewpoints and a description of the virtual viewpoints are recorded in an MPD text of media. In this way, when a terminal device downloads data on a per-frame basis according to frame information in the MPD text, bandwidth resources can be saved and the delay in view interaction can be reduced, thereby ensuring the image quality of playback.

The embodiments of the present disclosure will be further described in detail below in conjunction with the accompanying drawings.

FIG. 2 is a schematic diagram of a system architecture of an application scenario of a media information processing method according to an embodiment of the present disclosure. As shown in FIG. 2, the system architecture includes a video image capturing apparatus 110, a video image capturing apparatus 120, a server 130, and a terminal device 140.

The video image capturing apparatus 110 and the video image capturing apparatus 120 (e.g., cameras) are configured for capturing image information of a plurality of viewpoints, forming media information corresponding to the plurality of viewpoints, and sending the media information of the plurality of viewpoints to the server 130. The server 130 is configured for processing the media information of the plurality of viewpoints and generating a free-viewpoint media stream including at least one virtual viewpoint, performing segmentation and packing of the media stream, and generating an MPD text capable of describing the real viewpoints and the at least one virtual viewpoint. The MPD text is to be downloaded and parsed by the terminal device 140 when the terminal device 140 plays a video. When the terminal device 140 needs to play a video file, the terminal device 140 downloads the MPD text, parses the MPD text to obtain index file information and media segment file information, obtains a to-be-played media frame according to the index file information, and renders and plays the to-be-played media frame according to the media segment file information.

It can be understood by those having ordinary skills in the art that Dynamic Adaptive Streaming over HTTP (DASH) is an adaptive bitrate streaming technique. Its principle is that a media server segments a media file into segments having the same length in terms of time, and encodes the segments at different bitrates or resolutions, such that a terminal device needing to play the media file can download the segments with the corresponding bitrate and resolution based on an evaluation of its own performance and bandwidth. For example, the terminal device downloads the segment with a high bitrate when having high bandwidth, and downloads the segment with a low bitrate when having low bandwidth. Because the segments of different quality are aligned in terms of time, switching between the segments of different quality can be performed smoothly, thereby achieving a seamless switching effect. An MPD file is a media description file in the DASH protocol, which is an XML file that completely records information related to a video, including a video length, a bitrate, resolution, and other media information.

In a media information processing method applied to the system architecture of FIG. 2 according to the embodiment of the present disclosure, a description of real viewpoints and a description of virtual viewpoints are recorded in an MPD text, such that when playing the video, the terminal device can perform indexing as required and download data on a per-frame basis, thereby saving bandwidth resources. In this way, low-delay view interaction can be achieved during video playback, and the viewpoint switching does not affect image rendering and shooting position switching, thereby ensuring the smoothness of picture switching and optimizing the user experience of video playback.

Figure 3:
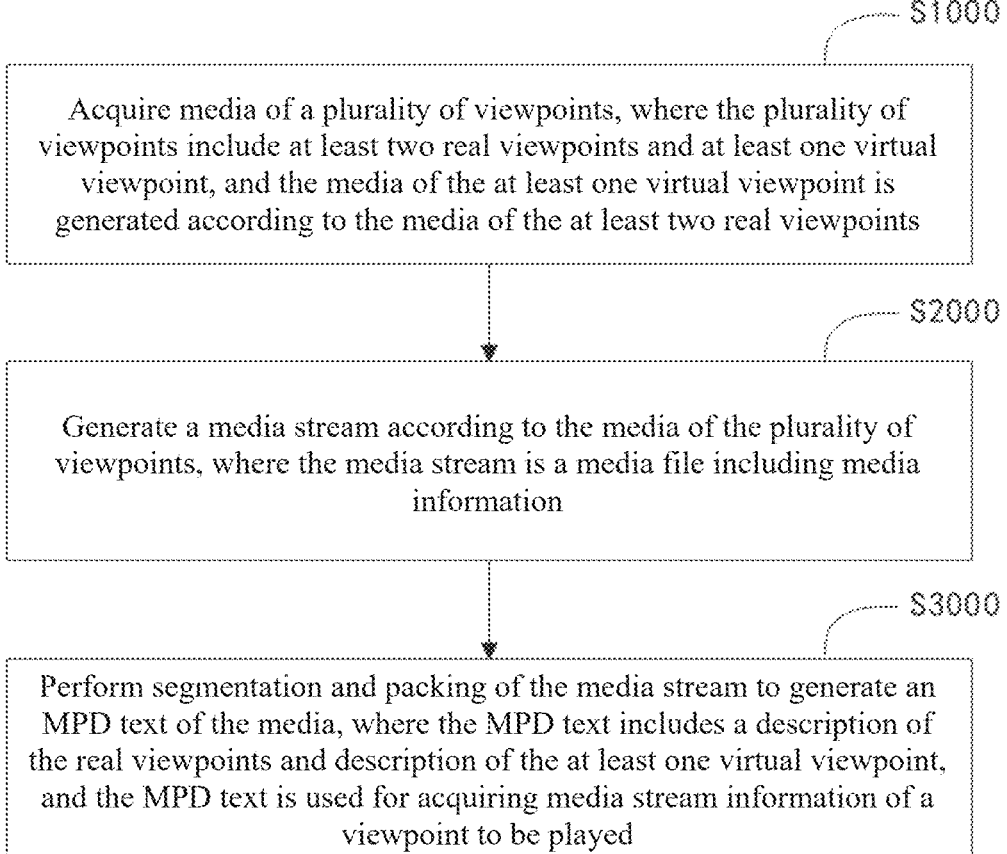
FIG. 3 is a flowchart of a media information processing method according to an embodiment of the present disclosure.

FIG. 3 is a flowchart of a media information processing method according to an embodiment of the present disclosure. As shown in FIG. 3, the media information processing method is applied to a media server. In the embodiment shown in FIG. 3, the media information processing method may include, but not limited to, the following steps S1000, S2000, and S3000.

At S1000, media of a plurality of viewpoints is acquired, where the plurality of viewpoints include at least two real viewpoints and at least one virtual viewpoint, and the media of the at least one virtual viewpoint is generated according to the media of the at least two real viewpoints.

At S2000, a media stream is generated according to the media of the plurality of viewpoints, where the media stream is a media file including media information.

In an embodiment, cameras are arranged at different angles and positions to capture images of a scene or an object to be photographed, to obtain video images of a plurality of real viewpoints, which are divided into a plurality of channels and input to a source end of the media server. The media server acquires a plurality of channels of original media streams corresponding to the real viewpoints, and generates a virtual viewpoint using a virtual viewpoint algorithm. In this case, the media server stores media information of at least two real viewpoints and at least one virtual viewpoint, and the media information corresponding to the real viewpoints and the at least one virtual viewpoint is used for video playback of the terminal device.

At S3000, segmentation and packing of the media stream are performed, and an MPD text of the media is generated, where the MPD text includes a description of the real viewpoints and a description of the at least one virtual viewpoint, and the MPD text is used for acquiring media stream information of a viewpoint to be played.

The media server segments and packs a real viewpoint media stream and a virtual viewpoint media stream, and generates a corresponding MPD text. The MPD text can help the terminal device to acquire the media stream information of the viewpoint to be played after the terminal device selects the viewpoint to be played.

FIG. 4 is a flowchart of a process of generating an MPD text according to an embodiment of the present disclosure. In the embodiment shown in FIG. 4, the generation of the MPD text includes, but not limited to, the following steps S3100, S3200, and S3300.

At S3100, segmentation and packing of all the real viewpoint media streams are performed to obtain a real viewpoint media segment file, where the real viewpoint media segment file includes a plurality of real viewpoint media frames; and segmentation and packing of all the virtual viewpoint media streams are performed to obtain a virtual viewpoint media segment file, where the virtual viewpoint media segment file includes a plurality of virtual viewpoint media frames.

In an embodiment, to obtain the real viewpoint media segment file, the media server performs frame synchronization on all the real viewpoint media streams, then merges all the frame-synchronized real viewpoint media streams into a single real viewpoint media stream, and finally segments and packs the single real viewpoint media stream to obtain the real viewpoint media segment file.

In an embodiment, to obtain the real viewpoint media segment file, the media server performs frame synchronization on all the real viewpoint media streams, then merges all the frame-synchronized real viewpoint media streams into a single real viewpoint media stream, and finally segments and packs the single real viewpoint media stream based on a DASH protocol to obtain the real viewpoint media segment file.

In an embodiment, to obtain the virtual viewpoint media segment file, the media server performs frame synchronization on all the virtual viewpoint media streams, then merges all the frame-synchronized virtual viewpoint media streams into a single virtual viewpoint media stream, and finally segments and packs the single virtual viewpoint media stream to obtain the virtual viewpoint media segment file.

In an embodiment, to obtain the virtual viewpoint media segment file, the media server performs frame synchronization on all the virtual viewpoint media streams, then merges all the frame-synchronized virtual viewpoint media streams into a single virtual viewpoint media stream, and finally segments and packs the single virtual viewpoint media stream based on a DASH protocol to obtain the virtual viewpoint media segment file.

At S3200, a real viewpoint media index file is generated according to the real viewpoint media segment file, where the real viewpoint media index file includes frame information of each of the real viewpoint media frames in the real viewpoint media segment file; and a virtual viewpoint media index file is generated according to the virtual viewpoint media segment file, where the virtual viewpoint media index file includes frame information of each of the virtual viewpoint media frames in the virtual viewpoint media segment file.

At S3300, the MPD text is generated according to the real viewpoint media segment file, the virtual viewpoint media segment file, the real viewpoint media index file, and the virtual viewpoint media index file.

To further illustrate the MPD text provided in the embodiments of the present disclosure, a schematic diagram of a structure of an MPD file is shown. As shown in FIG. 5, the structure of the MPD file includes, from outside to inside, Period→AdaptationSet→Representation→Segment. One or more Periods form an MPD file. Each Period represents media in a period of time. In the same Period, available media contents and their respective available bitrates do not change. AdaptationSet describes different types of media data in the same Period, such as subtitles, audio, and video. One or more AdaptationSets form a Period, and the AdaptationSets contain logically consistent media presentation formats. Representation describes different quality versions of the same media data type, i.e., Representations are the same except for bitrate and resolution. Segment is the smallest unit of the media concept in DASH, and represents a small media segment, to facilitate the terminal device in switching between different Representations during playback. The terminal device accesses a Uniform Resource Locator (URL) corresponding to the Segment to obtain media data that the terminal device can play.

The following embodiments provide a description of the real viewpoint media segment file in the MPD text.

In an embodiment, the MPD text includes an AdaptationSet field; and when the AdaptationSet field includes a cameras field, the AdaptationSet field is used for describing information of the real viewpoint media segment file, and the cameras field is used for representing a quantity of real viewpoints.

In an example, if cameras="15", it indicates that there are 15 real shooting positions in total. A specific file description is as follows.

```
<AdaptationSetcontentType="video" bitstreamSwitching="true"
cameras="15" segmentAlignment="true" frameRate="25/1" id="0"
lang="und">
...
</AdaptationSet>
```

The following embodiments provide a description of the real viewpoint media index file in the MPD text.

In an embodiment, the MPD text includes a MultiIdrIndex field, which may be a field at the same level as AdaptationSet. The MultiIdrIndex field is used for describing information of the real viewpoint media index file. In other words, if the MultiIdrIndex field is included in the MPD text, it indicates that the media stream is an index file media stream corresponding to a real viewpoint. A format value of the real viewpoint media index file is an MPI type value.

In an example, a mimetype type value "mpi" of the index file is added, where "i" refers to a first letter of the word "index". A specific file description is as follows.

```
<MultiIdrIndexmimeType="video/mpi" id="2">
<Representation id="0">
<SegmentTemplatetimescale="12800"
initialization="free-video-init.m4"
startNumber="1" media="free-stream.$Number$.mpi">
<SegmentTimeline>
<S d="64000" t="0" />
</SegmentTimeline>
</SegmentTemplate>
</Representation>
</MultiIdrIndex>
```

The following embodiments provide a description of the virtual viewpoint media segment file in the MPD text.

In an embodiment, the MPD text includes an AdaptationSet field; and when the AdaptationSet field includes an "insert" field, the AdaptationSet field is used for describing information of the virtual viewpoint media segment file, and a value of the "insert" field represents a quantity of virtual viewpoints added between adjacent real viewpoints.

In an example, if insert="1", it indicates that a virtual viewpoint is added between adjacent shooting positions, corresponding to one channel of virtual video. A specific file description is as follows.

```
<AdaptationSetcontentType="video" bitstreamSwitching="true"
cameras="15" insert="1" segmentAlignment="true" frameRate="25/1"
id="0" lang="und">
...
</AdaptationSet>
```

The following embodiments provide a description of the virtual viewpoint media index file in the MPD text.

In an embodiment, the MPD text includes a MultiIdrIndex field, and the MultiIdrIndex field further includes an "insert" field. In this case, the MultiIdrIndex field is used for describing information of the virtual viewpoint media index file, and a value of the "insert" field represents a quantity of virtual viewpoints added between adjacent real viewpoints. In other words, if the MultiIdrIndex field includes the "insert" field, it indicates that the media stream is an index file media stream corresponding to a virtual viewpoint.

In an example, an "insert" field is added to the MultiIdrIndex field to indicate the quantity of virtual viewpoints added between two adjacent positions, and if insert="1", it indicates that a virtual viewpoint is added between adjacent shooting positions, and the virtual viewpoint corresponds to one channel of virtual video. A specific file description is as follows.

```
<MultiIdrIndexmimeType="video/mpi" id="2" insert="1" >
...
</MultiIdrIndex>
```

It should also be noted that the media index file is packed based on a Moving Picture Experts Group Audio Layer IV (MP4) format, i.e., each channel of video corresponds to a "MOOF" box. The "MOOF" box includes a frame size of each channel of video. According to the frame size of each channel of video, a frame offset value can be obtained. The terminal device can download frames based on the frame size and the frame offset value.

Figure 6:
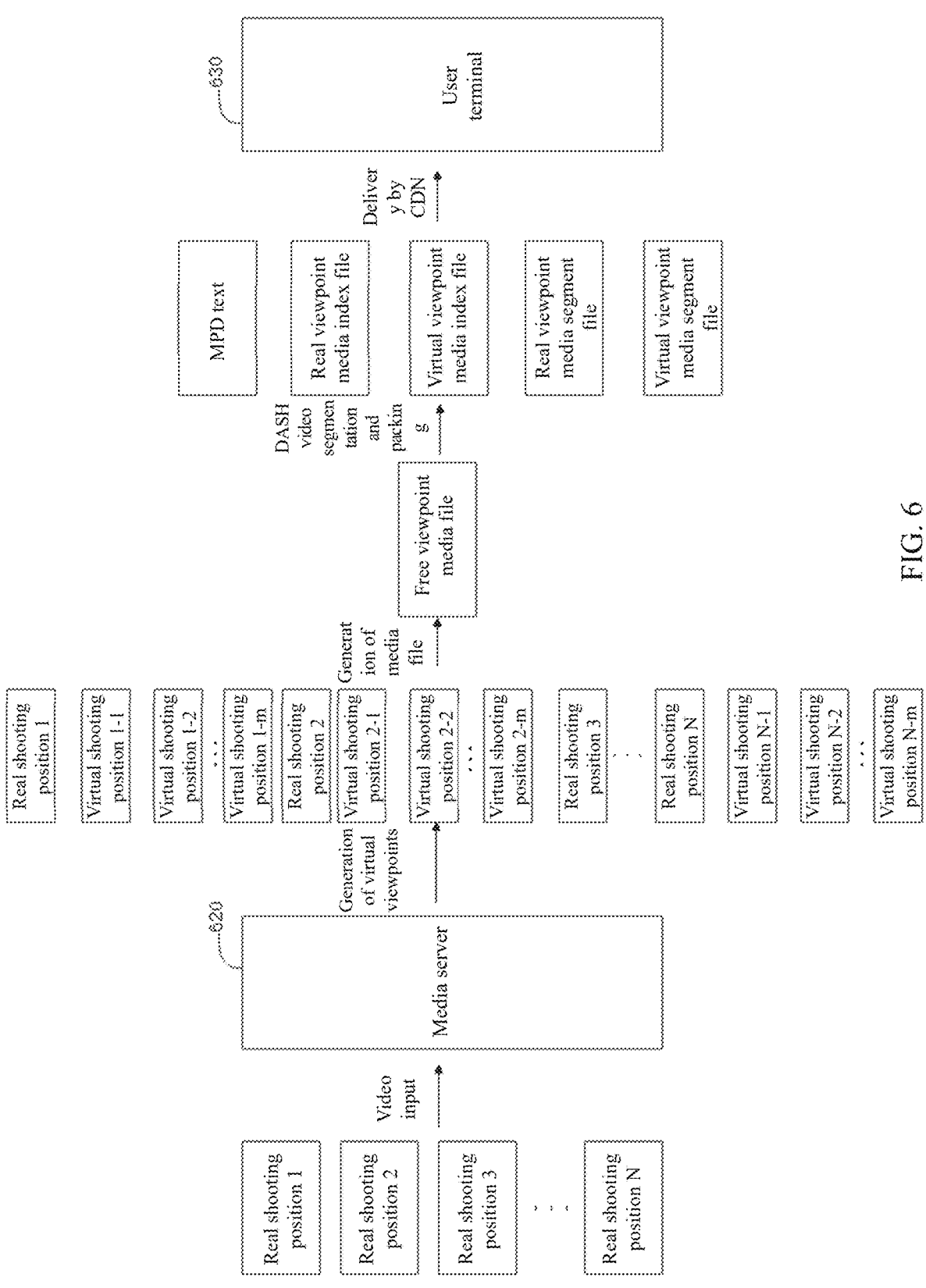
FIG. 6 is a schematic flowchart of media information processing by a media server according to an embodiment of the present disclosure.

FIG. 6 is a schematic flowchart of media information processing by a media server according to an embodiment of the present disclosure. As shown in FIG. 6, to acquire a free-viewpoint video image, N physical cameras are arranged at N shooting positions for video image capturing. A real shooting position 1, a real shooting position 2, a real shooting position 3, and a real shooting position N are illustrated in FIG. 6 by way of example. Viewpoint information captured by these physical cameras at the real shooting positions is real viewpoint information. N channels of free-viewpoint media streams captured by the N shooting positions are input to a media server 620. After receiving the N channels of real viewpoint media streams, the media server 620 synthesizes m virtual shooting positions between every two adjacent real shooting positions using a virtual viewpoint generation algorithm. For example, the media server 620 generates a virtual shooting positions 2-1, a virtual shooting position 2-2, . . . , and a virtual shooting position 2-_m_ between the real shooting position 2 and the real shooting position 3. These virtual shooting positions correspond to m channels of virtual viewpoint media streams. Then, the media server 620 packs the real viewpoint media streams and the virtual viewpoint media streams using an ISO BMFF file format to obtain a free viewpoint media file. The free viewpoint media file includes a description of information such as real shooting positions and virtual shooting positions corresponding to media. Then, the media server 620 segments and packs all the real viewpoint media streams to obtain a real viewpoint media segment file, segments and packs all the virtual viewpoint media streams to obtain a virtual viewpoint media segment file, generates a real viewpoint media index file according to the real viewpoint media segment file, generate a virtual viewpoint media index file according to the virtual viewpoint media segment file, and finally generates an MPD text according to the real viewpoint media segment file, the virtual viewpoint media segment file, the real viewpoint media index file, and the virtual viewpoint media index file. When the terminal device 630 initiates a video playback request, the video playback request is delivered based on a Content Delivery Network (CDN).

To enable the terminal device to select and download a media stream corresponding to a viewpoint, in the DASH protocol, the viewpoint information or camera information corresponding to the viewpoint is described using descriptors, which exist at the AdaptationSet level or the Representation level. When a media file is generated using the ISO BMFF format, the descriptors are used to describe the viewpoint information or the camera information corresponding to the viewpoint and are included in a "MOOF" box or a "MOOV" box in the form of boxes.

In the following embodiments, the viewpoint is respectively described from the perspective of the viewpoint information and the perspective of the camera information corresponding to the viewpoint.

In an embodiment, physical cameras and virtual cameras are described using a camera descriptor AvsFreeViewCamInfo, which may include camera indication information, position information of the camera, identification information of the camera, and identification information of the physical camera associated with the virtual camera. It can be understood that in practical applications, one camera descriptor may be selected for description, or a plurality of or even all camera descriptors may be selected for description.

The free-viewpoint camera descriptor AvsFreeViewCamInfo is a SupplementalProperty element. The camera descriptor may exist at the AdaptationSet level or the Representation level. When the camera descriptor exists at the AdaptationSet level, the camera descriptor describes cameras corresponding to all the Representations in the AdaptationSet layer. When the camera descriptor exists at the Representation level, the camera descriptor describes a camera corresponding to the Representation. Table 1 below is a table of specific attributes of the camera descriptor.

TABLE 1

| Elements and attributes of descriptor | Usage | Data type | Description |
|---|---|---|---|
| AvsFreeViewCam | 0 . . . N | avs:ims:2018:av3l | The attribute of this element indicates an attribute of a free-viewpoint camera corresponding to the corresponding representation or representation set. A plurality of such elements may exist. |
| AvsFreeViewCam@cameraId | M | xs:unsignedInt | It indicates a camera identifier corresponding to each camera. |
| AvsFreeViewCam@camera_pos_x | M | xs:float | It indicates the value of an x component of the position of the camera. |
| AvsFreeViewCam@camera_pos_y | M | xs:float | It indicates the value of a y component of the position of the camera. |
| AvsFreeViewCam@camera_pos_z | M | xs:float | It indicates the value of a z component of the position of the camera. |
| AvsFreeViewCam@virtual_flag | CM | xs:bool | It indicates whether the camera corresponding to the viewpoint described by the box is a virtual camera. A value of 1 indicates a virtual camera. A value of 0 indicates a physical camera. By default, it indicates a physical camera. |
| AvsFreeViewCam@related_camera | O | xs:unsignedInt | Used when virtual_flag is 1, indicating the identifiers of the physical cameras associated with the virtual camera, which are separated by commas, i.e., indicating physical cameras corresponding to an image of the virtual camera. |

TABLE 1-continued

| Elements and attributes of descriptor | Usage | Data type | Description |
|---|---|---|---|
| AvsFreeView@related_quality_ranking | 0 | xs:unsignedInt | It indicates the image quality level of the virtual camera, and is used when virtual_flag is 1, to indicate the image quality level of the virtual camera as compared to the real camera. |

In another embodiment, physical cameras and virtual cameras are described using a free viewpoint descriptor AvsFreeViewInfo, which may include identification information of a viewpoint, camera identification information corresponding to the viewpoint, camera indication information, and identification information of the physical camera associated with the virtual camera. It can be understood that in practical applications, one free viewpoint descriptor may be selected for description, or a plurality of or even all free viewpoint descriptors may be selected for description.

The free viewpoint descriptor AvsFreeViewInfo is a SupplementalProperty element. The free viewpoint descriptor may exist at the AdaptationSet level or the Representation level. When the free viewpoint descriptor exists at the AdaptationSet level, the free viewpoint descriptor describes viewpoints corresponding to all the Representations in the AdaptationSet layer. When the free viewpoint descriptor exists at the Representation level, the free viewpoint descriptor describes a viewpoint corresponding to the Representation. Table 2 below is a table of specific attributes of the free viewpoint descriptor.

It should be noted that in the embodiments of this application, free viewpoint media data is packed based on an International Organization for Standardization Base Media File Format (ISO BMFF) format. It should be noted that in a limited scheme, i.e., in an application scenario where virtual viewpoints need to be synthesized, for ISO basic media file formats of an information box, a track reference box, a track group box, and the like, reference may be made to MPEG-4 Part 12 ISO Base Media File Format formulated by ISO/IEC JTC1/SC29/WG11.

Based on the ISO basic media file format, all data are packed in a box. The ISO basic media file format includes several boxes, each of which has a type and length, and can be regarded as a data object. A box that can accommodate other boxes is called a container box.

In an embodiment, the real viewpoint media frame and the virtual viewpoint media frame are both packed in an ISO BMFF media file, the ISO BMFF media file includes a free viewpoint information box, and the free viewpoint information box is used for describing viewpoint information in a media track or track fragment. The viewpoint information includes at least one of a quantity of cameras or viewpoint indication information corresponding to a viewpoint, and the

TABLE 2

| Elements and attributes of descriptor | Usage | Data type | Description |
|---|---|---|---|
| AvsFreeView | 0 . . . N | avs:ims:2018:av3l | The attribute of this element indicates an attribute of a free viewpoint corresponding to the corresponding representation or representation set. A plurality of such elements may exist. |
| AvsFreeView@viewId | M | xs:unsignedInt | It indicates an identifier for each viewpoint. |
| AvsFreeView@cameraId | M | xs:unsignedInt | It indicates an identifier of a camera corresponding to each viewpoint. |
| AvsFreeView@virtual_flag | M | xs:bool | It indicates whether the free viewpoint corresponding to the viewpoint described by the box is a virtual viewpoint. A value of 1 indicates a virtual viewpoint. A value of 0 indicates a physical viewpoint. By default, it indicates a physical viewpoint. |
| AvsFreeView@related_camera | O | xs:unsignedInt | Used when virtual_flag is 1, indicating the identifiers of the physical cameras associated with the virtual viewpoint, which are separated by commas, i.e., indicating original physical cameras corresponding to an image of a synthetic virtual viewpoint. |
| AvsFreeView@related_quality_ranking | 0 | xs:unsignedInt | It indicates the image quality level of the virtual camera, and is used when virtual_flag is 1, to indicate the image quality level of the virtual viewpoint as compared to the real viewpoint. | viewpoint indication information is used for indicating that a camera corresponding to the viewpoint is a physical camera or a virtual camera.

In an embodiment, media description metadata is packed in a MOOV box or a MOOF box, and detailed information of the corresponding media track or media segment is described by a track fragment box or a media track box included in the MOOV or MOOF. To be specific, the free viewpoint information box AvsFreeViewInfoBox is used to describe information of a viewpoint in the media track or track fragment, including a data amount of the viewpoint included in the track and whether the viewpoint corresponding to the track is a virtual viewpoint. If the viewpoint corresponding to the track is a virtual viewpoint, the free viewpoint information box may include an image quality level of the virtual viewpoint, etc. The free viewpoint information box is used for indicating one or more free viewpoints included in a corresponding track and camera metadata information corresponding to the one or more free viewpoints. Details are as follows.

```
Box Type: 'afvi'
Container: SchemeInformationBox or SampleEntry
Mandatory :  No
Quantity: Zero or one
aligned(8) class AvsFreeViewInfoBox extends FullBox('afvi'){
unsigned int(8) codec_independency;
unsigned int(1)   texture_in_track;
unsigned int(1)   depth_in_track;
unsigned int(8) camera_count;
for(i=0; i<camera_count; i++){
unsigned int(1)   virtual_flag;
if(virtual_flag){
unsigned int(8)   virtual_quality_ranking;
}
unsigned int(8) camera_params_flag;
if(camera_params_flag){
    unsigned int (1)   IntCamera_Info_flag;
unsigned int (1)   ExtCamera_Info_flag;
if (IntCamera_Info_flag)
IntCameraInfoStruct( );
if(ExtCamera_Info_flag)
ExtCameraInfoStruct( );
      else
          unsigned int(8) camera_id;
        }
    }
}
``` where virtual_flag indicates whether the camera corresponding to the viewpoint described by the box is a virtual camera;

virtual_quality_ranking indicates the image quality level of the virtual camera;

codec_independency indicates codec independency between a texture map and a depth map corresponding to each camera in the track;

texture_in_track indicates whether the media track includes a texture map, where a value of 1 includes that the media track includes a texture map, and a value of 0 indicates that the media track does not include a texture map;

depth_in_track indicates whether the media track includes a depth map, where a value of 1 includes that the media track includes a depth map, and a value of 0 indicates that the media track does not include a depth map;

camera_count indicates the quantity of all cameras that capture the video;

camera_id indicates the identifier of the camera corresponding to each view;

IntCamera_Info_flag indicates whether intrinsic parameter information of the camera is included, where a value of 0 indicates that the intrinsic parameter information of the camera is not included, and a value of 1 indicates that the intrinsic parameter information of the camera is included;

ExtCamera_Info_flag indicates whether extrinsic parameter information of the camera is included, where a value of 0 indicates that the extrinsic parameter information of the camera is not included, and a value of 1 indicates that the extrinsic parameter information of the camera is included;

IntCameraInfoStruct( ) indicates the intrinsic parameter information of the camera; and ExtCameraInfoStruct( ) indicates the extrinsic parameter information of the camera.

It should be noted that there is an association between virtual viewpoints and real viewpoints, and usually, a virtual viewpoint image is synthesized by at least two real viewpoint images. The associated virtual viewpoint and real viewpoints are combined through a track group mode, or the virtual viewpoint is associated with real viewpoints through a track reference mode.

In an embodiment, when the virtual viewpoint is associated with the real viewpoints through the track group mode, a group type is used for identification. A specific implementation is as follows.

```
aligned(8) class TrackGroupTypeBox(unsigned int(32) track_group_type)
extends FullBox(track_group_type, version = 0, flags = 0)
{
    unsigned int(32) track_group_id;
    // the remaining data may be specified
    //   for a particular track_group_type
}
``` where the track_group_type is set to "cvre" to indicate that the track group includes a virtual viewpoint and real viewpoints associated with the virtual viewpoint.

In another embodiment, when the virtual viewpoint is associated with the real viewpoints through the track reference mode, a reference type is used for identification. A specific implementation is as follows.

```
aligned(8) class TrackReferenceTypeBox (unsigned int(32)
reference_type) extends Box(reference_type) {
    unsigned int(32) track_IDs[ ];
}
``` where the reference_type is set to "cvtr" to indicate the association between the media track corresponding to the virtual viewpoint and the media tracks corresponding to the real viewpoints.

Figure 7:
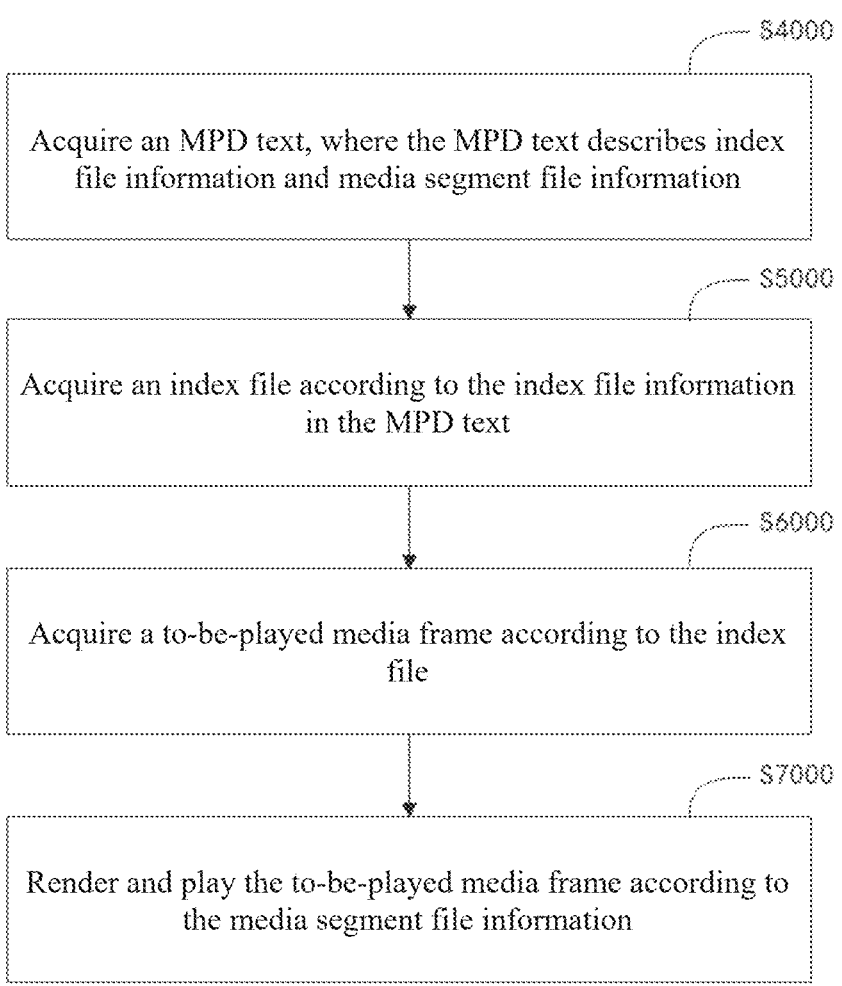
FIG. 7 is a flowchart of a media information playback method according to an embodiment of the present disclosure.

FIG. 7 is a flowchart of a media information playback method according to an embodiment of the present disclosure. As shown in FIG. 7, the media information playback method is applied to a terminal device. In the embodiment shown in FIG. 7, the media information playback method may include, but not limited to, the following steps S4000, S5000, S6000, and S7000.

At S4000, an MPD text is acquired, where the MPD text describes index file information and media segment file information.

It should be noted that the MPD text acquired by the terminal device is the MPD text generated by the media server in the above embodiments, and index file information and media segment file information are recorded in the MPD text.

It can be understood that the media segment file information may include video segment information, audio segment information, and the like.

At S5000, an index file is acquired according to the index file information in the MPD text.

The terminal device acquires the corresponding index file according to the index file information in the MPD text. The index file can help the terminal device quickly find target frame information.

At S6000, a to-be-played media frame is acquired according to the index file.

After determining a specific view, bitrate, and other parameters, the terminal device acquires a to-be-played media frame according to the index file.

At S7000, the to-be-played media frame is rendered and played according to the media segment file information.

The terminal device performs frame reading, decoding, rendering, and other operations on the acquired to-be-played media frame, and finally realizes media information playback.

In an embodiment, when the terminal device has a new view in response to a view switching operation, the terminal device acquires viewpoint information that is after the view switching, acquires a new to-be-played media frame according to the viewpoint information and the index file, and finally renders and plays the new to-be-played media frame according to the media segment file information.

In an embodiment, when the media playback is used in a live streaming or on-demand application scenario, the new to-be-played media frame is a next media frame that is after the view switching.

In an embodiment, when the media playback is used in a bullet time application scenario, the new to-be-played media frame is the current media frame that is after the view switching. In this way, a slow motion or even time-lapse effect can be achieved.

It should be noted that the viewpoint information acquired by the terminal device after view switching may be viewpoint information of a real viewpoint or viewpoint information of a virtual viewpoint. In an embodiment, when the terminal device is selected to play only media information of a real viewpoint, the viewpoint information only includes the viewpoint information of the real viewpoint, and the viewpoint information of the virtual viewpoint is blocked.

Figure 8:
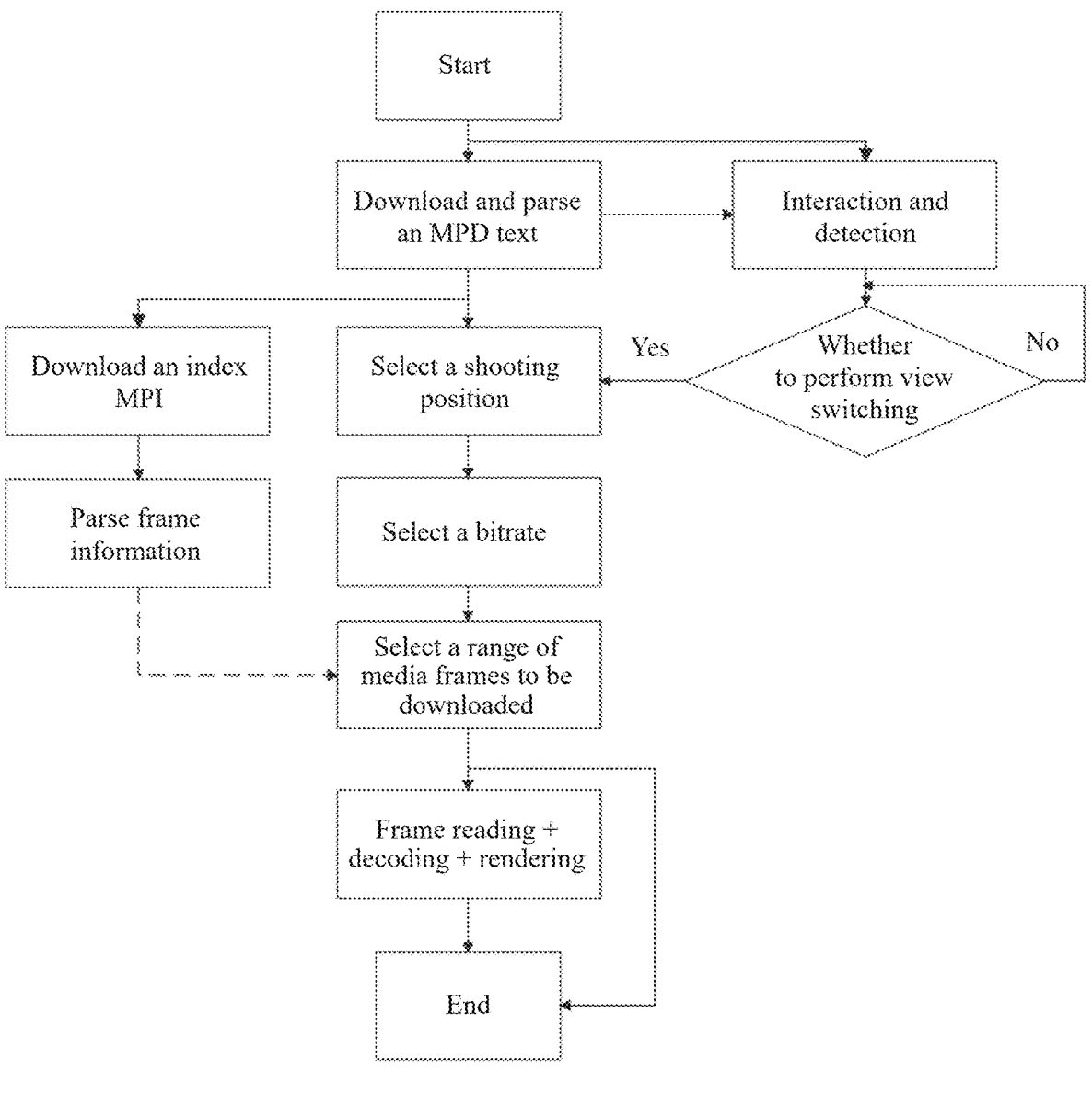
FIG. 8 is a schematic flowchart of media information playback by a terminal device according to an embodiment of the present disclosure.

FIG. 8 is a schematic flowchart of media information playback by a terminal device according to an embodiment of the present disclosure. As shown in FIG. 8, after the terminal device starts playing media information, the terminal device first downloads and parses an MPD text to obtain a real viewpoint media index file and a virtual viewpoint media index file whose format values are an MPI type value, downloads the media index files, and parses frame information. The frame information is information of a media frame to be played. Based on a shooting position or a bitrate that the terminal device is currently selected to execute, the terminal device downloads a corresponding media frame from the media server, and performs reading, decoding, rendering, and other operations on the media frame to realize the playback of the media information.

The terminal device further detects in real time whether the user has performed a view switching operation. If the user does not perform a view switching operation, the terminal device continues to remain in a detection state without making any response. If detecting that the user has performed a view switching operation, the terminal device acquires, in response to the view switching operation, viewpoint information that is after the view switching, i.e., new viewpoint information, which may correspond to a new shooting position or a new bitrate, and repeats the above steps. That is, based on the new shooting position or bitrate that the terminal device is selected to execute, the terminal device downloads a corresponding media frame from the media server, and performs reading, decoding, rendering, and other operations on the media frame to realize the playback of the media information.

It can be understood that the view switching operation may be performed by the user or trigged by other program settings. When detecting a view switching request, the terminal device changes shooting position value information in response to the request, and then downloads a frame according to the changed shooting position value to complete view switching.

A description of real viewpoints and a description of the virtual viewpoints are recorded in an MPD text of media. In this way, when a terminal device downloads data on a per-frame basis according to frame information in the MPD text, bandwidth resources can be saved and the delay in view interaction can be reduced, thereby ensuring the image quality of playback.

The application of the media information processing method and the media information playback method provided in the embodiments of the present disclosure will be described in detail below through four application scenarios. Scenario One:

Scenario One corresponds to a live streaming scenario. Video capturing apparatuses, such as cameras, capture a plurality of channels of real shooting position video streams, and send the plurality of channels of real shooting position video streams to a media server. The media server generates virtual view video stream according to the plurality of channels of real shooting position video streams. The media server respectively performs frame synchronization on all the real viewpoint media streams and the virtual viewpoint media streams, merges all the frame-synchronized real viewpoint media streams into a single real viewpoint media stream, and merges all the frame-synchronized virtual viewpoint media streams into a single virtual viewpoint media stream. The media server performs segmentation and packing of the single real viewpoint media stream and the single virtual viewpoint media stream respectively to obtain a real viewpoint media segment file and a virtual viewpoint media segment file. Then, the media server generates a real viewpoint media index file according to the real viewpoint media segment file, and generates a virtual viewpoint media index file according to the virtual viewpoint media segment file. The real viewpoint media index file includes frame information of each of the real viewpoint media frames in the real viewpoint media segment file. The virtual viewpoint media index file includes frame information of each of the virtual viewpoint media frames in the virtual viewpoint media segment file. Finally, the media server generates an MPD text according to the real viewpoint media segment file, the virtual viewpoint media segment file, the real viewpoint media index file, and the virtual viewpoint media index file.

Figures 9, 10:
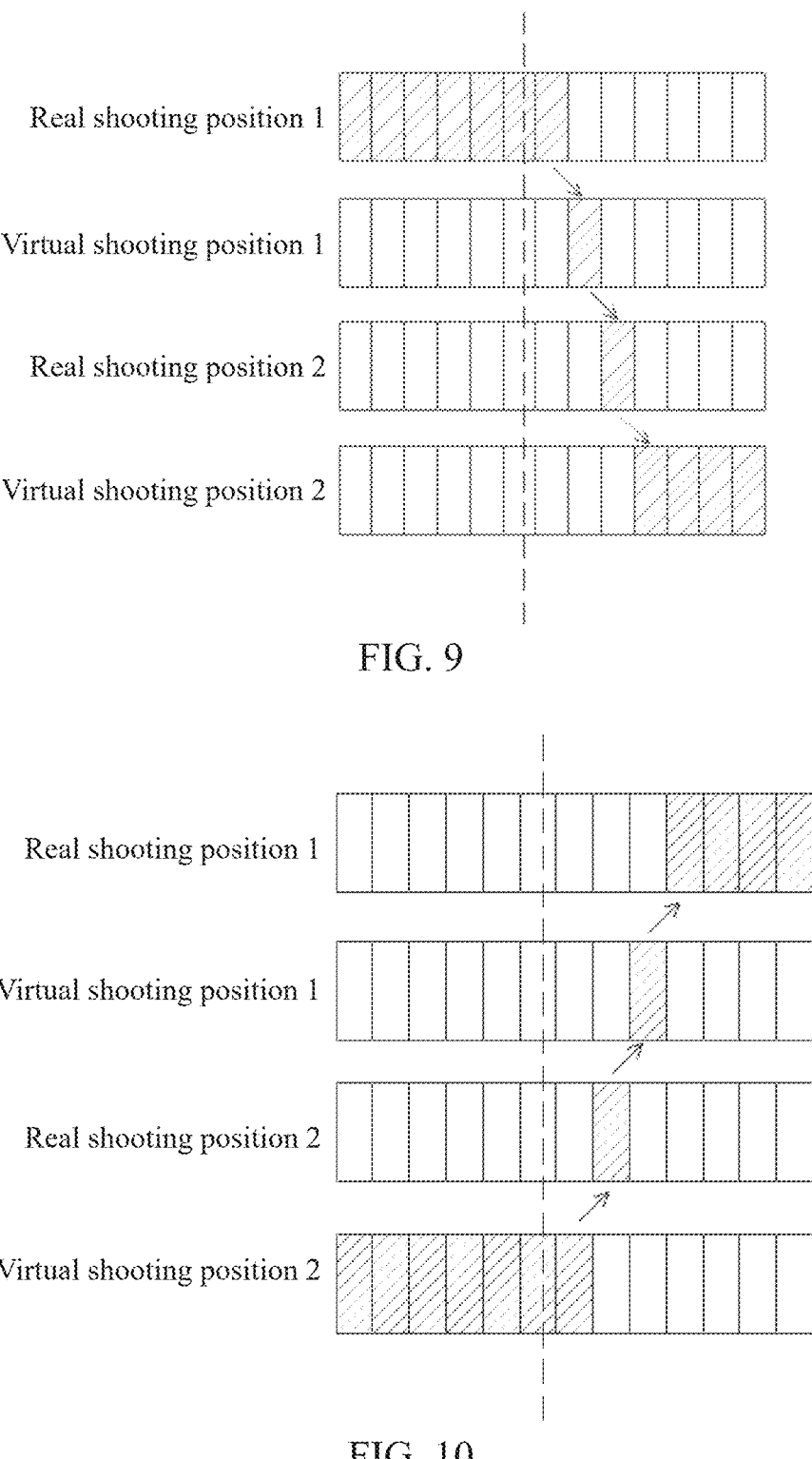
FIG. 9 is a schematic diagram of switching frames in virtual view switching corresponding to a live streaming scenario according to an embodiment of the present disclosure.
FIG. 10 is a schematic diagram of switching frames in virtual view switching corresponding to an on-demand scenario according to an embodiment of the present disclosure.

FIG. 9 is a schematic diagram of switching frames in virtual view switching corresponding to a live streaming scenario according to an embodiment of the present disclosure. As shown in FIG. 9, in the live streaming scenario, a client in the terminal device downloads an MPD text and parses the MPD text to obtain a media index file and a media segment file. The media segment file includes a video segment, an audio segment, a subtitle segment, etc. Based on a selection currently made by the user, a media frame corresponding to a real shooting position 1 is played. Media frames that have been played, are being played, or are to be played are denoted by shadows in FIG. 9. It can be seen from FIG. 9 that when the user performs view switching, e.g., switches from the real shooting position 1 to a virtual shooting position 1, the terminal device changes the current shooting position value, and downloads and plays a next frame of the shooting position that is after the view switching, i.e., a shaded media frame corresponding to the virtual shooting position 1 in FIG. 9. Similarly, when subsequently receiving other view switching requests, the terminal device executes similar operations, i.e., downloads and plays a next frame of the shooting position that is after the view switching. With this method, the playback of the free viewpoint media is smooth and jitter-free with satisfactory image quality, low delay in view interaction, occupation of relatively small bandwidth, and low requirements on the performance of the terminal device.

Scenario Two:

Scenario Two corresponds to an on-demand scenario, which is different from the live streaming scenario mainly in that media information is not captured in real time by video capturing apparatuses, but is recorded in advance, and the virtual viewpoint media streams may be generated by a media server or other servers. In this application scenario, the media server respectively performs segmentation and packing of the single real viewpoint media stream and the single virtual viewpoint media stream to obtain a real viewpoint media segment file and a virtual viewpoint media segment file. Then, the media server generates a real viewpoint media index file according to the real viewpoint media segment file, and generates a virtual viewpoint media index file according to the virtual viewpoint media segment file. The real viewpoint media index file includes frame information of each of the real viewpoint media frames in the real viewpoint media segment file. The virtual viewpoint media index file includes frame information of each of the virtual viewpoint media frames in the virtual viewpoint media segment file. Finally, the media server generates an MPD text according to the real viewpoint media segment file, the virtual viewpoint media segment file, the real viewpoint media index file, and the virtual viewpoint media index file.

FIG. 10 is a schematic diagram of switching frames in virtual view switching corresponding to an on-demand scenario according to an embodiment of the present disclosure. As shown in FIG. 10, in the on-demand scenario, a client in the terminal device downloads an MPD text and parses the MPD text to obtain a media index file and a media segment file. The media segment file includes a video segment, an audio segment, a subtitle segment, etc. Based on a selection currently made by the user, a media frame corresponding to a virtual shooting position 2 is played. Media frames that have been played, are being played, or are to be played are denoted by shadows in FIG. 10. It can be seen from FIG. 10 that when the user performs view switching, e.g., switches from the virtual shooting position 2 to a real shooting position 2, the terminal device changes the current shooting position value, and downloads and plays a next frame of the shooting position that is after the view switching, i.e., a shaded media frame corresponding to the real shooting position 2 in FIG. 10. Similarly, when subsequently receiving other view switching requests, the terminal device executes similar operations, i.e., downloads and plays a next frame of the shooting position that is after the view switching. With this method, the playback of the free viewpoint media is smooth and jitter-free with satisfactory image quality, low delay in view interaction, occupation of relatively small bandwidth, and low requirements on the performance of the terminal device.

Scenario Three:

Scenario Three corresponds to a bullet time scenario. Bullet time is a special effect that refers to a simulation of variable-speed photography used in films, broadcast advertisements, and video games, so as to achieve enhanced slow motion, time-lapse, and other effects.

The bullet time scenario is different from the live streaming scenario mainly in that media information is not captured in real time by video capturing apparatuses, but is recorded in advance, and the virtual viewpoint media streams may be generated by a media server or other servers; and is different from the on-demand scenario mainly in the media frame played after the view switching.

In this application scenario, the media server respectively performs segmentation and packing of the single real viewpoint media stream and the single virtual viewpoint media stream to obtain a real viewpoint media segment file and a virtual viewpoint media segment file. Then, the media server generates a real viewpoint media index file according to the real viewpoint media segment file, and generates a virtual viewpoint media index file according to the virtual viewpoint media segment file. The real viewpoint media index file includes frame information of each of the real viewpoint media frames in the real viewpoint media segment file. The virtual viewpoint media index file includes frame information of each of the virtual viewpoint media frames in the virtual viewpoint media segment file. Finally, the media server generates an MPD text according to the real viewpoint media segment file, the virtual viewpoint media segment file, the real viewpoint media index file, and the virtual viewpoint media index file.

Figure 11:
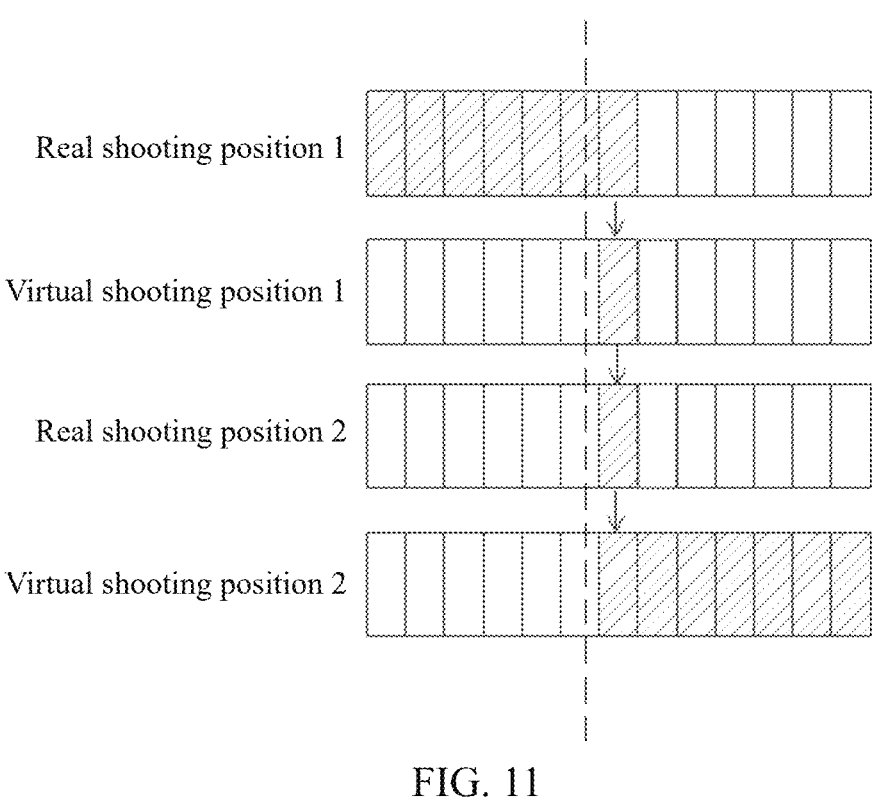
FIG. 11 is a schematic diagram of switching frames in virtual view switching corresponding to a bullet time scenario according to an embodiment of the present disclosure.

FIG. 11 is a schematic diagram of switching frames in virtual view switching corresponding to a bullet time scenario according to an embodiment of the present disclosure. As shown in FIG. 11, in the bullet time scenario, a client in the terminal device downloads an MPD text and parses the MPD text to obtain a media index file and a media segment file. The media segment file includes a video segment, an audio segment, a subtitle segment, etc. Based on a selection currently made by the user, a media frame corresponding to a real shooting position 1 is played. Media frames that have been played, are being played, or are to be played are denoted by shadows in FIG. 11. It can be seen from FIG. 11 that when the user performs view switching, e.g., switches from the real shooting position 1 to a virtual shooting position 1, the terminal device changes the current shooting position value, and downloads and plays the same frame of the shooting position that is after the view switching, i.e., a shaded media frame corresponding to the virtual shooting position 1 in FIG. 11. Similarly, when subsequently receiving other view switching requests, the terminal device executes similar operations, i.e., downloads and plays the same frame of the shooting position that is after the view switching. With this method, a bullet time effect is achieved, and the playback of the free viewpoint media is smooth and jitter-free with satisfactory image quality, low delay in view interaction, occupation of relatively small bandwidth, and low requirements on the performance of the terminal device.

Scenario Four:

Scenario Four corresponds to a virtual viewpoint blocking scenario, and is different from the on-demand scenario mainly in the media frame of the shooting position played after the view switching.

In this application scenario, the media server respectively performs segmentation and packing of the single real viewpoint media stream and the single virtual viewpoint media stream to obtain a real viewpoint media segment file and a virtual viewpoint media segment file. Then, the media server generates a real viewpoint media index file according to the real viewpoint media segment file, and generates a virtual viewpoint media index file according to the virtual viewpoint media segment file. The real viewpoint media index file includes frame information of each of the real viewpoint media frames in the real viewpoint media segment file. The virtual viewpoint media index file includes frame information of each of the virtual viewpoint media frames in the virtual viewpoint media segment file. Finally, the media server generates an MPD text according to the real viewpoint media segment file, the virtual viewpoint media segment file, the real viewpoint media index file, and the virtual viewpoint media index file.

Figure 12:
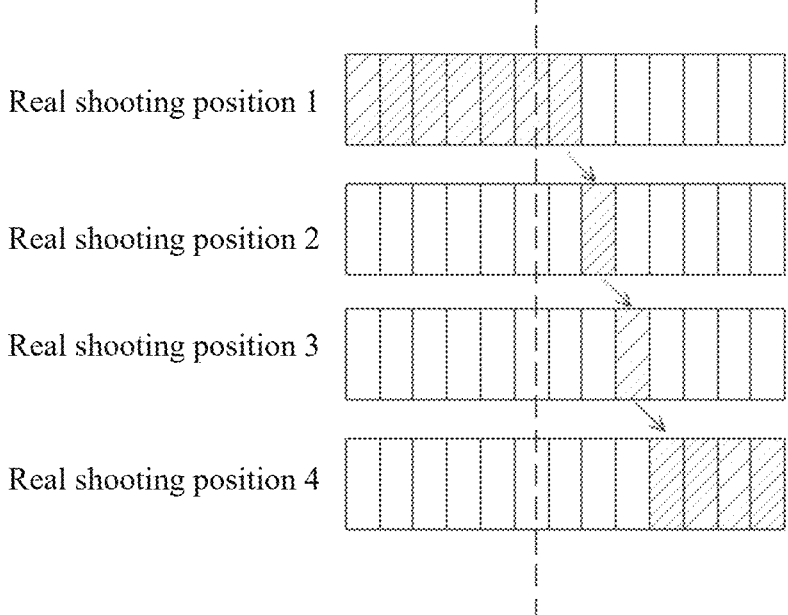
FIG. 12 is a schematic diagram of switching frames in virtual view switching corresponding to a virtual viewpoint blocking scenario according to an embodiment of the present disclosure.

FIG. 12 is a schematic diagram of switching frames in virtual view switching corresponding to a virtual viewpoint blocking scenario according to an embodiment of the present disclosure. As shown in FIG. 12, a client downloads an MPD text and parses the MPD text to obtain a media index file and a media segment file. The media segment file includes a video segment, an audio segment, a subtitle segment, etc. In this scenario, only media information corresponding to real viewpoints is played. Therefore, based on a selection currently made by the user, only media frames corresponding to real shooting positions 1 to 4 are played, and media frames corresponding to virtual shooting positions are not displayed. It can be seen from FIG. 12 that when the user performs view switching, e.g., switches from the real shooting position 1 to the real shooting position 2, the terminal device changes the current shooting position value, and downloads and plays a next frame of the shooting position that is after the view switching, i.e., a shaded media frame corresponding to the real shooting position 2 in FIG. 12. Similarly, when subsequently receiving other view switching requests, the terminal device executes similar operations, i.e., downloads and plays a next frame of the real shooting position that is after the view switching. With this method, virtual viewpoints are blocked, and the playback of the free viewpoint media is smooth and jitter-free with satisfactory image quality, low delay in view interaction, occupation of relatively small bandwidth, and low requirements on the performance of the terminal device.

Figure 13:
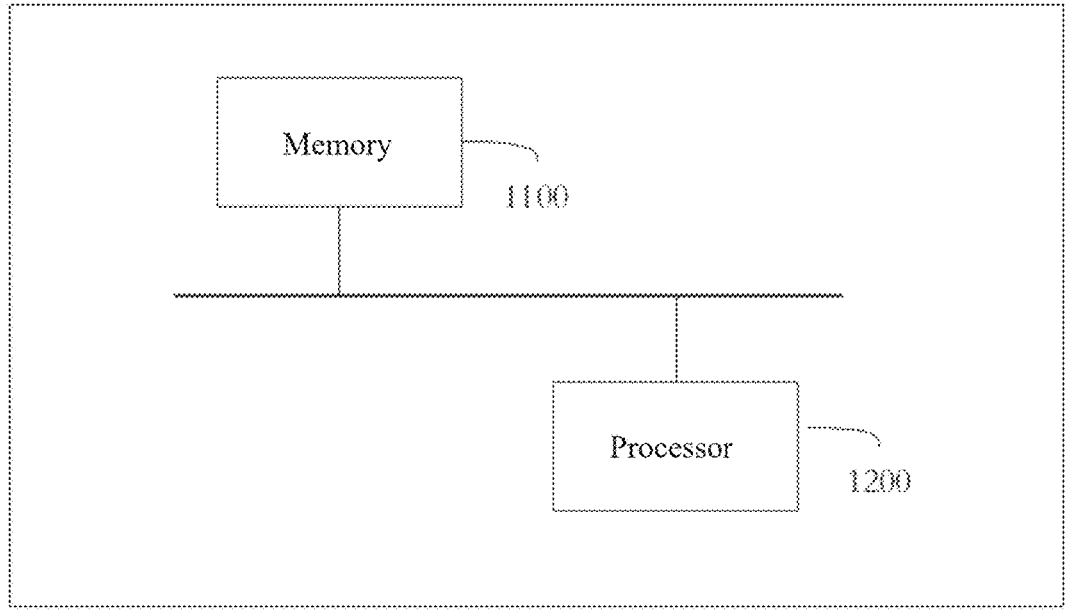
FIG. 13 is a schematic structural diagram of a media information processing apparatus according to an embodiment of the present disclosure.

FIG. 13 is a schematic structural diagram of a media information processing apparatus according to an embodiment of the present disclosure. As shown in FIG. 13, the media information processing apparatus includes a memory 1100 and a processor 1200. The device may include one or more memories 1100 and one or more processors 1200. FIG. 13 uses one memory 1100 and one processor 1200 as an example. The memory 1100 and the processor 1200 may be connected by a bus or in other ways. Connection by a bus is taken as an example in FIG. 13.

The memory 1100, as a computer-readable storage medium, may be configured for storing a software program, a computer-executable program, and modules, for example, program instructions/modules corresponding to the media information processing method provided in any embodiment of the present disclosure. The processor 1200 runs the software program, instructions, and modules stored in the memory 1100, to implement the media information processing method.

The memory 1100 may mainly include a program storage area and a data storage area. The program storage area may store an operating system, and an application required by at least one function. In addition, the memory 1100 may include a high-speed random access memory, and may also include a nonvolatile memory, e.g., at least one magnetic disk storage device, flash memory device, or other nonvolatile solid-state storage device. In some examples, the memory 1100 may further include memories located remotely from the processor 1200, and the remote memories may be connected to the device via a network. Examples of the network include, but not limited to, the Internet, an intranet, a local area network, a mobile communication network, and combinations thereof.

Figure 14:
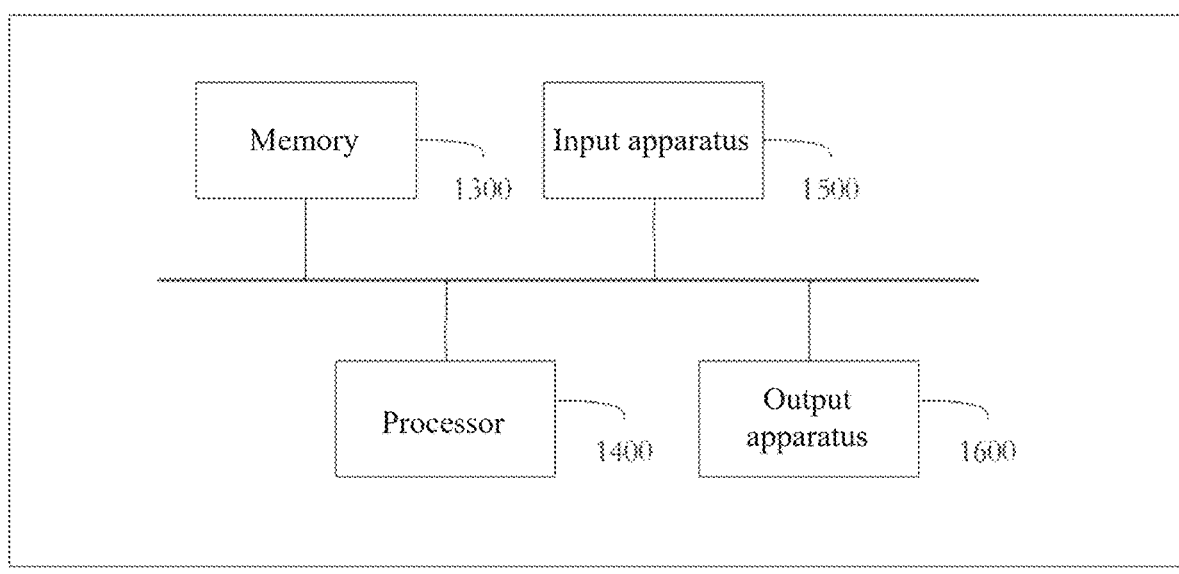
FIG. 14 is a schematic structural diagram of a media information playback apparatus according to an embodiment of the present disclosure.

FIG. 14 is a schematic structural diagram of a media information playback apparatus according to an embodiment of the present disclosure. As shown in FIG. 14, in an embodiment, the media information playback apparatus may include a memory 1300, a processor 1400, an input apparatus 1500, and an output apparatus 1600.

The input apparatus 1500 may be configured for receiving inputted numerical or character information, and generating a key signal input related to user settings and function control of the device. The output apparatus 1600 may include a display device such as a display screen.

An embodiment of the present disclosure further provides a computer-readable storage medium storing a computer-executable instruction which, when executed by a processor, causes the processor to implement the media information processing method or the media information playback method provided in any embodiment of the present disclosure.

The system architecture and application scenarios described in the embodiments of the present disclosure are for the purpose of illustrating the technical schemes of the embodiments of the present disclosure more clearly, and do not constitute a limitation on the technical schemes provided in the embodiments of the present disclosure. Those having ordinary skills in the art may know that with the evolution of the system architecture and the emergence of new application scenarios, the technical schemes provided in the embodiments of the present disclosure are also applicable to similar technical problems.

Those having ordinary skills in the art can understand that all or some of the steps in the methods disclosed above and the functional modules/units in the system and the apparatus can be implemented as software, firmware, hardware, and appropriate combinations thereof.

In a hardware implementation, the division of the functional modules/units mentioned in the above description does not necessarily correspond to the division of physical components. For example, one physical component may have multiple functions, or one function or step may be jointly executed by several physical components. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette, a magnetic tape, a magnetic disk storage or other magnetic storage device, or any other medium which can be used to store the desired information and which can be accessed by a computer. In addition, as is known to those having ordinary skill in the art, the communication medium typically includes computer-readable instructions, data structures, program modules, or other data in a modulated data signal such as a carrier or other transport mechanism, and can include any information delivery medium.

As used in this specification, the terms "component", "module", "system" and the like are used to denote computer-related entities, hardware, firmware, a combination of hardware and software, software, or software in execution. For example, a component may be, but not limited to, a process running on a processor, a processor, an object, an executable file, a thread of execution, a program, or a computer. An application running on a computing device and the computing device may both be illustrated as components. One or more components may reside in a process or thread of execution. A component may be located on one computer or distributed on two or more computers. In addition, the components may be executed from various computer-readable media having various data structures stored therein. The components may communicate via local and/or remote processes such as in accordance with a signal having one or more data packets (e.g., data from one component interacting with another component in a local system, distributed system, and/or across a network such as the Internet with other systems via the signal).

Although some embodiments of the present disclosure are described above with reference to the accompanying drawings, these embodiments are not intended to limit the protection scope of the present disclosure. Any modifications, equivalent replacements and improvements made by those having ordinary skills in the art without departing from the scope and essence of the present disclosure shall fall within the protection scope of the present disclosure.

What is claimed is:

1. A media information processing method, comprising:
acquiring media of a plurality of viewpoints, wherein the plurality of viewpoints comprise at least one real viewpoint and at least one virtual viewpoint, and the media of the at least one virtual viewpoint is generated according to the media of the at least one real viewpoint;
generating a media stream according to the media of the plurality of viewpoints, wherein the media stream is a media file comprising media information; and
performing segmentation and packing of the media stream, and generating a Media Presentation Description (MPD) text of the media, wherein the MPD text comprises a description of the real viewpoints and a description of the at least one virtual viewpoint, and the MPD text is used for acquiring media stream information of a viewpoint to be played;
wherein the media stream comprises a plurality of real viewpoint media streams and a plurality of virtual viewpoint media streams; and
performing segmentation and packing of the media stream, and generating an MPD text of the media comprises:

performing segmentation and packing of all the real viewpoint media streams to obtain a real viewpoint media segment file, wherein the real viewpoint media segment file comprises a plurality of real viewpoint media frames;
performing segmentation and packing of all the virtual viewpoint media streams to obtain a virtual viewpoint media segment file, wherein the virtual viewpoint media segment file comprises a plurality of virtual viewpoint media frames;
generating a real viewpoint media index file according to the real viewpoint media segment file, wherein the real viewpoint media index file comprises frame information of each of the real viewpoint media frames in the real viewpoint media segment file;
generating a virtual viewpoint media index file according to the virtual viewpoint media segment file, wherein the virtual viewpoint media index file comprises frame information of each of the virtual viewpoint media frames in the virtual viewpoint media segment file; and
generating the MPD text according to the real viewpoint media segment file, the virtual viewpoint media segment file, the real viewpoint media index file, and the virtual viewpoint media index file.

2. The media information processing method of claim 1, wherein performing segmentation and packing of all the real viewpoint media streams to obtain a real viewpoint media segment file comprises:
performing frame synchronization for all the real viewpoint media streams;
merging all the frame-synchronized real viewpoint media streams into a single real viewpoint media stream; and
performing segmentation and packing of the single real viewpoint media stream to obtain the real viewpoint media segment file.

3. The media information processing method of claim 2, wherein performing segmentation and packing of the single real viewpoint media stream to obtain the real viewpoint media segment file comprises:
performing segmentation and packing of the single real viewpoint media stream based on a Dynamic Adaptive Streaming over HTTP (DASH) protocol to obtain the real viewpoint media segment file.

4. The media information processing method of claim 1, wherein performing segmentation and packing of all the virtual viewpoint media streams to obtain a virtual viewpoint media segment file comprises:
performing frame synchronization for all the virtual viewpoint media streams;
merging all the frame-synchronized virtual viewpoint media streams into a single virtual viewpoint media stream; and
performing segmentation and packing of the single virtual viewpoint media stream to obtain the virtual viewpoint media segment file.

5. The media information processing method of claim 4, wherein performing segmentation and packing of the single virtual viewpoint media stream to obtain the virtual viewpoint media segment file comprises:
performing segmentation and packing of the single virtual viewpoint media stream based on a DASH protocol to obtain the virtual viewpoint media segment file.

6. The media information processing method of claim 1, wherein the MPD text comprises a MultiIdrIndex field, the MultiIdrIndex field is used for describing information of the real viewpoint media index file, and a format value of the real viewpoint media index file is an MPI type value;

wherein in response to the MultiIdrIndex field comprising an insert field, the MultiIdrIndex field is used for describing information of the virtual viewpoint media index file, and a value of the insert field represents a quantity of virtual viewpoints added between adjacent real viewpoints.

7. The media information processing method of claim 1, wherein the MPD text comprises an AdaptationSet field; and in response to the AdaptationSet field comprising a cameras field, the AdaptationSet field is used for describing information of the real viewpoint media segment file, and the cameras field is used for representing a quantity of real viewpoints;

wherein in response to the AdaptationSet field comprising an insert field, the AdaptationSet field is used for describing information of the virtual viewpoint media segment file, and a value of the insert field represents a quantity of virtual viewpoints added between adjacent real viewpoints.

8. The media information processing method of claim 1, wherein the real viewpoint media index file and the virtual viewpoint media index file are packed in a Moving Picture Experts Group Audio Layer IV (MP4) format, the real viewpoint media stream and the virtual viewpoint media stream each correspond to a MOOF box, and the MOOF box comprises a media frame size.

9. The media information processing method of claim 1, wherein the real viewpoint corresponds to a physical camera, the virtual viewpoint corresponds to a virtual camera, both the physical camera and the virtual camera are described by a camera descriptor, and the camera descriptor comprises at least one of:

camera indication information;

position information of the camera;

identification information of the camera; or identification information of the physical camera associated with the virtual camera.

10. The media information processing method of claim 1, wherein the real viewpoint corresponds to a physical camera, the virtual viewpoint corresponds to a virtual camera, both the real viewpoint and the virtual viewpoint are described by a free viewpoint descriptor, and the free viewpoint descriptor comprises at least one of:

identification information of the viewpoint;

camera identification information corresponding to the viewpoint;

camera indication information; or identification information of the physical camera associated with the virtual camera.

11. The media information processing method of claim 1, wherein the real viewpoint media frame and the virtual viewpoint media frame are both packed in an International Organization for Standardization Base Media File Format (ISO BMFF) media file.

12. The media information processing method of claim 1, wherein the media file is an ISO BMFF media file, the ISO BMFF media file comprises a free viewpoint information box, and the free viewpoint information box is used for describing viewpoint information in a media track or track fragment;

wherein the free viewpoint information box is used for indicating one or more free viewpoints comprised in a corresponding track and camera metadata information corresponding to the one or more free viewpoints;

wherein the viewpoint information comprises at least one of a quantity of cameras or viewpoint indication information corresponding to a viewpoint, and the viewpoint indication information is used for indicating that a camera corresponding to the viewpoint is a physical camera or a virtual camera;

wherein in response to the viewpoint information comprising the viewpoint indication information, and the viewpoint indication information indicates that the camera corresponding to the viewpoint is a virtual camera, the viewpoint information further comprises an image quality level of the virtual camera.

13. The media information processing method of claim 11, wherein an association relationship exists between the real viewpoint and the virtual viewpoint, and the real viewpoint and the virtual viewpoint are associated through a track group mode or a track reference mode.

14. A media information playback method, comprising:

acquiring a Media Presentation Description (MPD) text, wherein the MPD text describes index file information and media segment file information;

acquiring an index file according to the index file information in the MPD text;

acquiring a to-be-played media frame according to the index file; and rendering and playing the to-be-played media frame according to the media segment file information;

wherein the MPD text is generated by performing segmentation and packing of a media stream, wherein the media stream comprises a plurality of real viewpoint media streams and a plurality of virtual viewpoint media streams; and performing segmentation and packing of the media stream to generate the MPD text comprises:

performing segmentation and packing of all the real viewpoint media streams to obtain a real viewpoint media segment file, wherein the real viewpoint media segment file comprises a plurality of real viewpoint media frames;

performing segmentation and packing of all the virtual viewpoint media streams to obtain a virtual viewpoint media segment file, wherein the virtual viewpoint media segment file comprises a plurality of virtual viewpoint media frames;

generating a real viewpoint media index file according to the real viewpoint media segment file, wherein the real viewpoint media index file comprises frame information of each of the real viewpoint media frames in the real viewpoint media segment file;

generating a virtual viewpoint media index file according to the virtual viewpoint media segment file, wherein the virtual viewpoint media index file comprises frame information of each of the virtual viewpoint media frames in the virtual viewpoint media segment file; and generating the MPD text according to the real viewpoint media segment file, the virtual viewpoint media segment file, the real viewpoint media index file, and the virtual viewpoint media index file.

15. The media information playback method of claim 14, further comprising:

in response to a view switching operation, acquiring viewpoint information after view switching;

acquiring a new to-be-played media frame according to the viewpoint information and the index file; and rendering and playing the new to-be-played media frame according to the media segment file information.

16. The media information playback method of claim 15, wherein the new to-be-played media frame comprises one of:

a next media frame after the view switching; or a current media frame after the view switching.

17. The media information playback method of claim 15, wherein the viewpoint information is viewpoint information of a real viewpoint or viewpoint information of a virtual viewpoint.

18. A media information processing apparatus, comprising: a memory, a processor, and a computer program stored in the memory and executable by the processor which, when executed by the processor, causes the processor to perform the media information processing method of claim 1.

19. A media information playback apparatus, comprising: a memory, a processor, and a computer program stored in the memory and executable by the processor which, when executed by the processor, causes the processor to perform the media information playback method of claim 14.

20. A non-transitory computer-readable storage medium, storing data related to a media stream, the data comprising a Media Presentation Description (MPD) text, wherein the MPD text describes index file information and media segment file information;

the index file information in the MPD text is used for acquiring an index file;

the index file is used for acquiring a to-be-played media frame; and the media segment file information is used for rendering and playing the to-be-played media frame;

wherein the media stream comprises a plurality of real viewpoint media streams and a plurality of virtual viewpoint media streams, the MPD text is generated by performing segmentation and packing of the media stream, comprising:

performing segmentation and packing of all the real viewpoint media streams to obtain a real viewpoint media segment file, wherein the real viewpoint media segment file comprises a plurality of real viewpoint media frames;

performing segmentation and packing of all the virtual viewpoint media streams to obtain a virtual viewpoint media segment file, wherein the virtual viewpoint media segment file comprises a plurality of virtual viewpoint media frames;

generating a real viewpoint media index file according to the real viewpoint media segment file, wherein the real viewpoint media index file comprises frame information of each of the real viewpoint media frames in the real viewpoint media segment file;

generating a virtual viewpoint media index file according to the virtual viewpoint media segment file, wherein the virtual viewpoint media index file comprises frame information of each of the virtual viewpoint media frames in the virtual viewpoint media segment file; and generating the MPD text according to the real viewpoint media segment file, the virtual viewpoint media segment file, the real viewpoint media index file, and the virtual viewpoint media index file.

\*   \*   \*   \*   \*